United States Patent [19]

Guenther

[11] Patent Number: 5,377,218
[45] Date of Patent: Dec. 27, 1994

[54] HF-EXCITED LASER FOR HIGH INPUT POWERS, PARTICULARLY A $CO_2$ STRIPLINE LASER

[75] Inventor: Wolfgang Guenther, Munich, Germany

[73] Assignee: Siemens Aktiengesellschaft, Munich, Germany

[21] Appl. No.: 125,597

[22] Filed: Sep. 23, 1993

[30] Foreign Application Priority Data

Sep. 30, 1992 [DE] Germany .............................. 4232840

[51] Int. Cl.[5] .............................................. H01S 3/03
[52] U.S. Cl. ...................................... 372/61; 372/38; 372/82
[58] Field of Search ................ 372/61, 82, 38, 87, 372/65

[56] References Cited

U.S. PATENT DOCUMENTS 5,245,625 9/1993 Guenther ............................. 372/61

Primary Examiner—Léon Scott, Jr.
Attorney, Agent, or Firm—Hill, Steadman & Simpson

[57] ABSTRACT

An HF-excited laser for high input powers, particularly a $CO_2$ stripline laser, is provided. For supply of a high-power HF energy, a matching unit is integrated into the laser. The matching unit contains an L-C element, whereby the inductance L and the capacitance C are variable. The inductance can be set by a variation of the length of the electrically conductive parts of an HF feed and of an HF tap. The capacitor is annularly designed and the capacitance is defined by the size of a capacitor wafer and by the properties of the dielectric.

7 Claims, 2 Drawing Sheets

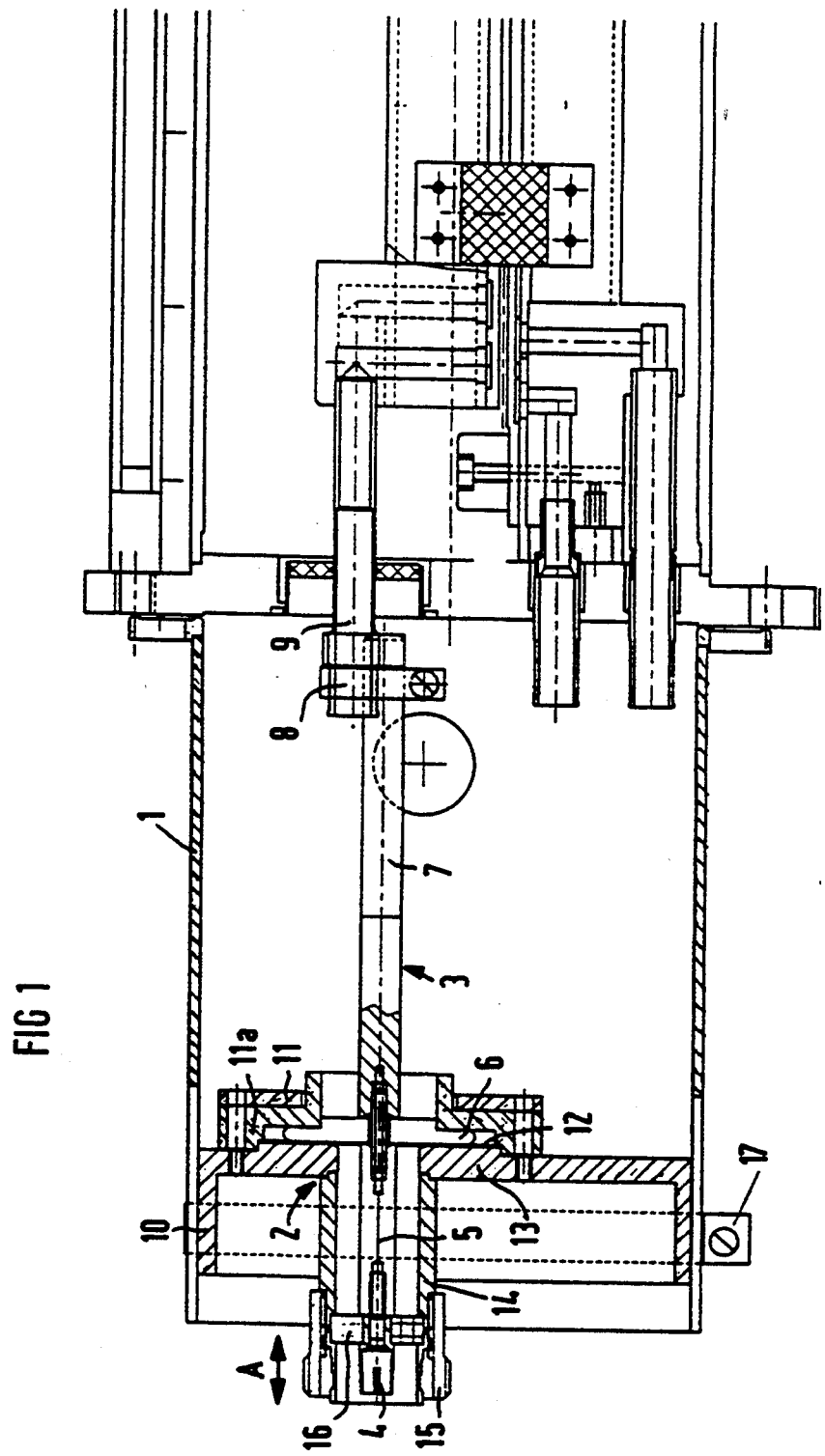

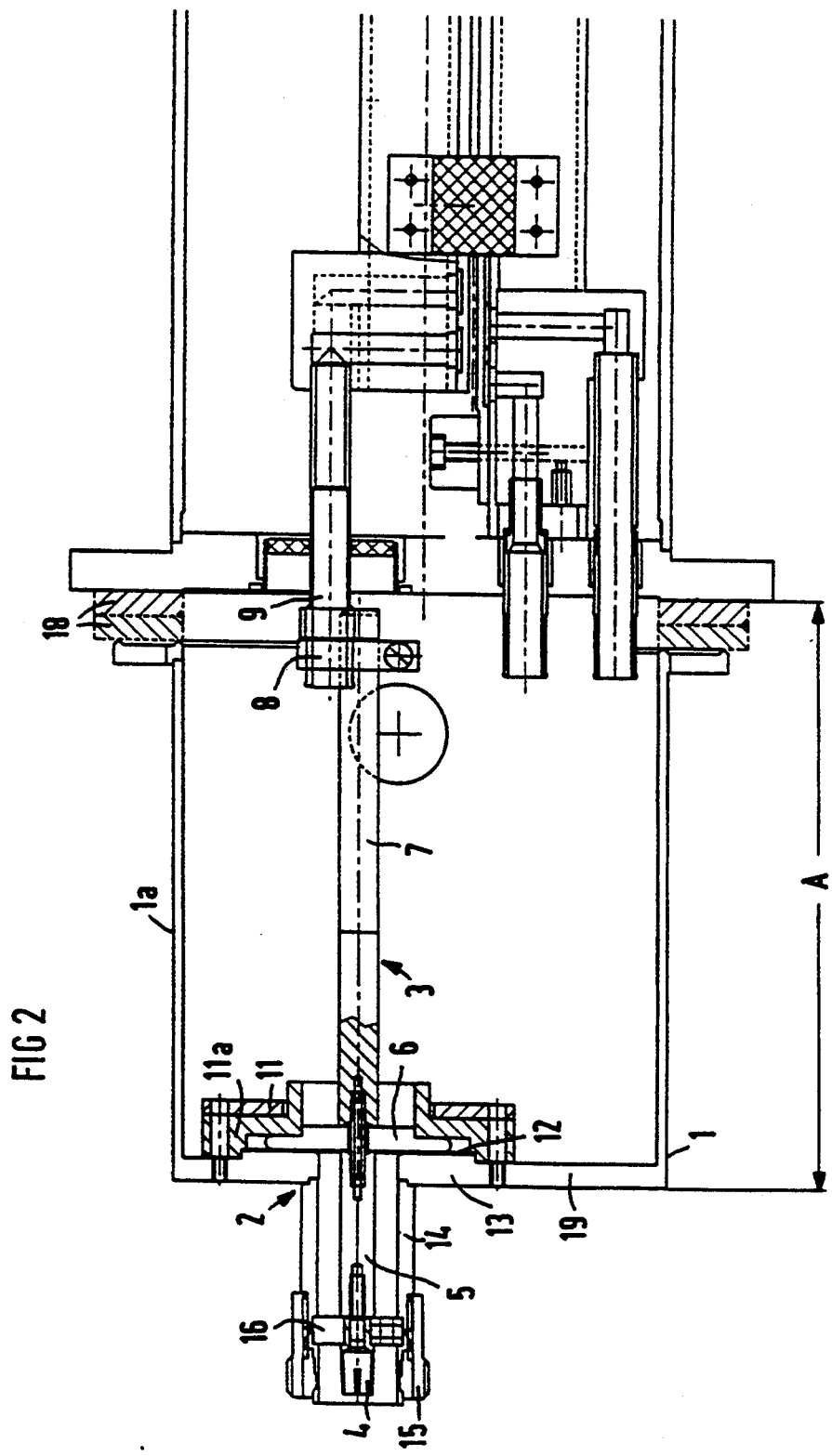

HF-EXCITED LASER FOR HIGH INPUT POWERS, PARTICULARLY A $CO_2$ STRIPLINE LASER

BACKGROUND OF THE INVENTION

The present invention is directed to an HF-excited laser for high input powers, particularly to a $CO_2$ stripline laser which contains a laser housing and a matching unit integrated into the laser housing for matching the impedance to the impedance of an HF feed. Such a laser is disclosed by European Application EP-A-0 477 879. A stripline laser is also disclosed by German Published Application 37 29 053.

A matching unit in HF-excited lasers having high power, for example given an input power of at least 1 kW, serves the purpose of transforming the impedance of the electrons exciting the plasma to the output impedance of the generator, this usually amounting to 50 Ohms, given a prescribed frequency. Up to now, either two short-circuit lines having a $\lambda/4$ spacing were inserted into the input line, or a $\pi$-element having a fixed series inductance and two variable shunt capacitors were utilized. The shunt-circuit lines, however, cause high currents and high voltages on the 50 Ohm lines, whereas the $\pi$-element must be constructed with a large volume.

SUMMARY OF THE INVENTION

An object of the present invention is to provide a compact structure of a matching element and, simultaneously, a minimization of the current load.

According to the invention, an HF-excited laser for high input powers is provided, particularly a $CO_2$ stripline laser which contains a laser housing and a matching unit integrated into the laser housing for matching the impedance to the impedance of an HF feed. The matching unit contains an L-C element which acts as a resonance transformer. An inductance L and capacitor C are variable. The inductance is set by a variation of the length of the electrically conducting parts between a high-frequency feed and a high-frequency tap of a high-frequency terminal. The capacitor is constructed by an outside conductor and by an inside conductor that is partially coaxial therewith. The inside conductor carries a concentric capacitor disc or wafer forming a first electrode plate of the capacitor and is conducted in insulated fashion through a face plate of the outside conductor that forms a second electrode plate of the annularly designed capacitor, whereby the two electrode plates lie against a dielectric.

The L-C element acts here as a resonance transformer at the prescribed frequency. The specific structure guarantees an HF-tight termination of the laser and an HF-tight connection to a high-frequency cable.

The capacitance of the capacitor is advantageously defined by the diameter of the capacitor disc or wafer, by the thickness of the dielectric, and by its dielectric constant.

An optimum exploitation of the space of the existing laser housing and a mechanically simple design are enabled in that the capacitor wafer is pressed against the face plate via an electrically insulating thrust collar. The matching unit is designed displaceable coaxially relative to the laser housing and in an axial direction relative thereto. The inner conductor contains a link that is behind the face plate and is movable or deformable in an axial direction. The axial position of the outer conductor relative to the laser housing defines the inductance that is set. The matching unit, however, can also form a non-displaceable part of the laser housing. In particular, the face plate together with the plug terminal can form the end wall of the laser housing. The inductance that is set is then defined by the length of the outer conductor variable in the axial direction relative to the laser housing. The outer conductor thereby completely surrounds the inner conductor up to a plug terminal for a coaxial plug and is adjacent to the housing wall in HF-tight fashion. The laser can thus be connected in HF-tight fashion to a connecting cable in a simple way.

The invention shall now be set forth in greater detail with reference to two figures having embodiments of the invention. It is not limited to the examples shown in the figures.

BRIEF DESCRIPTION OF THE DRAWINGS

FIG. 1 is a cross-sectional view of an HF-excited laser according to the invention; and FIG. 2 is an alternate embodiment of the laser shown in FIG. 1.

DESCRIPTION OF THE PREFERRED EMBODIMENTS

In FIG. 1, a matching unit 2 is accommodated in a laser housing 1. The matching unit 2 is composed of an L-C element, whereby an inductance is formed by the entire length of the HF feed and tap from and to the gas discharge space indicated in the right-hand part of the drawing. The HF feed is designed as an inside conductor 3 which is composed of an inside plug contact 4, of a pin 5, of a capacitor wafer 6, and of an inner conductor 7 that is variable in terms of its electrically effective length and which is in communication via a link to a laser electrode terminal 9 and is displaceable relative to the latter in the axial direction.

The end face of the capacitor wafer 6 is connected to the variable inner conductor 7 and is insulated by a dielectric 12, preferably Teflon or polyimide, from a face plate 13 of the outer conductor 10 and is pressed against this face plate 13 with screws via a thrust collar 11 and an insulating member 11a. The matching unit 2 is designed in displaceable fashion in the axial direction relative to the laser housing 1 and forms an HF-tight termination for the laser housing 1.

The face plate 13 is connected to the outside tube 14. The end region of the outside tube 14 is connected to an outside contact ring 15 and is supported against the inner conductor 3 via an insulating washer 16. The outside contact ring 15 serves the purpose of contacting an outside contact of a coaxial plug (not shown) whose shielded contact is contacted to the inside plug contact 4 of the inner conductor 3. After matching the inductance by displacing the overall matching unit 2 in the arrow direction A, this can be fixed relative to the laser housing 1 with a strap retainer 17.

Identical reference characters in FIG. 2 mean the same thing as in FIG. 1. The outer conductor, which is partially formed here by the laser tube 1a, is variable in length by introducing intermediate rings 18. The face plate 13 forms a fixed, integral component part of the end wall 19 of the laser housing 1.

Although various minor changes and modifications might be proposed by those skilled in the art, it will be understood that I wish to include within the scope of the patent warranted hereon all such changes and modifications as reasonably come within my contribution to the art.

I claim as my invention:

1. An HF-excited $CO_2$ stripline laser for high input powers, comprising:
   a laser housing;
   a matching unit integrated into the laser housing for matching an impedance of the laser to an impedance of an HF feed;
   the matching unit comprising an L-C element acting as a resonance transformer and wherein an inductance L and capacitor C thereof are variable;
   the inductance being settable by a variation of a length of electrically conductive parts thereof between an HF feed and an HF tap of an HF terminal;
   the capacitor comprising an outer conductor and an inner conductor partially coaxial with the outer conductor; and
   said inner conductor carrying a concentric capacitor wafer forming a first electrode plate of the capacitor and which is conducted in insulating fashion through a face plate of said outer conductor, said face plate forming a second electrode plate of said capacitor, said capacitor being annular, and both electrode plates of the capacitor lying against a dielectric.

2. A laser according to claim 1 wherein a capacitance of said capacitor is defined by a diameter of a round capacitor disc as said wafer, by a thickness of said dielectric, and by a dielectric constant of the dielectric.

3. A laser according to claim 1 wherein the capacitor wafer is pressed against said face plate via an electrically insulating thrust collar.

4. A laser according to claim 1 wherein the matching unit is designed coaxially relative to said laser housing and displaceable relative thereto in an axial direction thereof, said inner conductor containing a link that is behind said face plate and is movable in an axial direction, and wherein an axial position of the outer conductor relative to the laser housing defines an inductance that is set.

5. A laser according to claim 1 wherein said matching unit forms a non-displaceable part of said laser housing, said face plate of said outer conductor forming an end wall of said laser housing, and an inductance that is set being defined by a length of the outer conductor that is variable in an axial direction relative to the laser housing.

6. A laser according to claim 1 wherein said outer conductor completely envelopes the inner conductor up to a plug terminal for a coaxial plug and shields it HF-tight and also adjoins the laser housing in HF-type fashion.

7. An HF-excited $CO_2$ stripline laser for high input powers, comprising:
   a laser housing;
   a matching unit integrated into the laser housing for matching an impedance of the laser to an impedance of an HF feed;
   the matching unit comprising a variable inductor and a capacitor acting as a resonance transformer;
   the inductance being settable by a variation of a length of electrically conductive parts thereof between an HF feed and an HF tap of an HF terminal;
   the capacitor comprising an outer conductor and an inner conductor partially coaxial with the outer conductor; and
   said inner conductor carrying a concentric capacitor wafer forming a first electrode plate of the capacitor and which is conducted in insulating fashion through a face plate of said outer conductor, said face plate forming a second electrode plate of said capacitor, and a dielectric between the electrode plates of the capacitor.

* * * * *